(12) United States Patent
Yamagata et al.

(10) Patent No.: US 8,416,426 B2
(45) Date of Patent: Apr. 9, 2013

(54) CALIBRATING JIG, PROFILE MEASURING DEVICE, AND METHOD OF OFFSET CALCULATION

(75) Inventors: Masaoki Yamagata, Kawasaki (JP); Yasuhiro Takahama, Kawasaki (JP); Hiraku Ishiyama, Kawasaki (JP); Kentaro Nemoto, Kawasaki (JP)

(73) Assignee: Mitutoyo Corporation, Kawasaki-shi (JP)

( * ) Notice: Subject to any disclaimer, the term of this patent is extended or adjusted under 35 U.S.C. 154(b) by 0 days.

(21) Appl. No.: 13/369,079

(22) Filed: Feb. 8, 2012

(65) Prior Publication Data

US 2012/0188558 A1    Jul. 26, 2012

Related U.S. Application Data (63) Continuation of application No. 12/457,782, filed on Jun. 22, 2009, now Pat. No. 8,139,229.

(30) Foreign Application Priority Data

Jul. 10, 2008    (JP) .................................. 2008-180084

(51) Int. Cl.
    *G01B 11/24*    (2006.01)
(52) U.S. Cl.
    USPC ......................................... 356/601; 356/614

(58) Field of Classification Search .......... 356/601–625, 356/399–401, 495–496, 511
See application file for complete search history.

(56) References Cited

U.S. PATENT DOCUMENTS

| | | | |
|---|---|---|---|
| 3,708,378 A | 1/1973 | Tung | |
| 2005/0068418 A1* | 3/2005 | Kaneko et al. | 348/187 |
| 2007/0247639 A1 | 10/2007 | Amstel et al. | |

FOREIGN PATENT DOCUMENTS

| JP | A-11-083438 | 3/1999 |
|---|---|---|
| JP | A-2001-165630 | 6/2001 |
| JP | A-2003-207332 | 7/2003 |
| JP | A-2004-170400 | 6/2004 |
| JP | A-2006-292775 | 10/2006 |
| JP | A-2007-078635 | 3/2007 |
| JP | A-2007-205864 | 8/2007 |

OTHER PUBLICATIONS

U.S. Appl. No. 12/457,782, filed Jun. 22, 2009.
Aug. 17, 2011 Office Action issued in U.S. Appl. No. 12/457,782.
Dec. 23, 2011 Notice of Allowance issued in U.S. Appl. No. 12/457,782.
Nov. 13, 2009 Search Report issued in European Patent Application No. 09163697.7.

\* cited by examiner

*Primary Examiner* — Tri T Ton
(74) *Attorney, Agent, or Firm* — Oliff & Berridge, PLC (57) ABSTRACT

A calibrating jig comprises a reference sphere, and a reflecting plate configured to support the reference sphere from a lower side thereof and mirror-reflect light in a case that the reference sphere is illuminated from an upper side thereof.

3 Claims, 9 Drawing Sheets

CALIBRATING JIG, PROFILE MEASURING DEVICE, AND METHOD OF OFFSET CALCULATION

CROSS REFERENCE TO RELATED APPLICATIONS

This application is a continuation of application Ser. No. 12/457,782 filed Jun. 22, 2009 now U.S. Pat. No. 8,139,229 which is based upon and claims the benefit of priority from the prior Japanese Patent Application No. 2008-180084, filed on Jul. 10, 2008, the entire contents of which are incorporated herein by reference.

BACKGROUND OF THE INVENTION

1. Field of the Invention

The present invention relates to a calibrating jig, a profile measuring device, and a method of offset calculation in the profile measuring device.

2. Description of the Related Art

Conventionally, there is known a profile measuring device (image measuring device) that measures an outline profile, and so on, of an object-to-be-measured (work) from an image obtained by imaging the object-to-be-measured by an imaging means such as a CCD camera. In addition, there is known a profile measuring device of this kind that is provided also with a noncontact type optical probe, such as a laser probe, or the like, in addition to the imaging means, for improvement of measurement accuracy in a vertical direction, that is to say, a Z direction (for example, refer to patent document 1: JP 11-83438 A).

In a case that an offset exists between an image measuring function of such imaging means and a noncontact displacement detecting function of such noncontact type optical probe, this offset must be quantitatively measured. Various jigs are used for calculation of this offset value.

Figure 13:
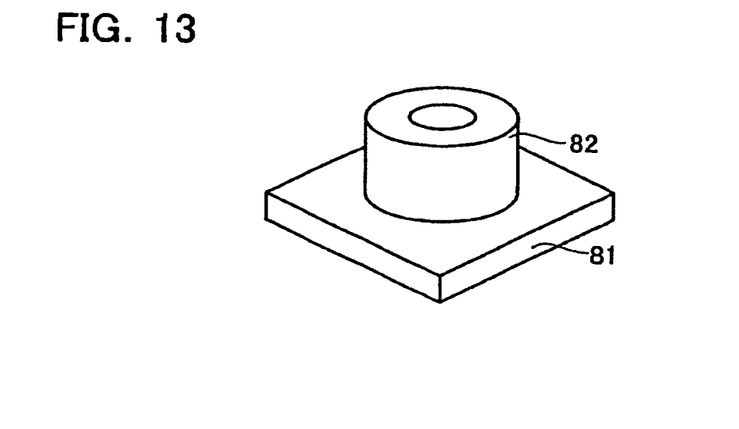
FIG. 13 is a view showing an example of a conventional calibrating jig.
Figure 14:
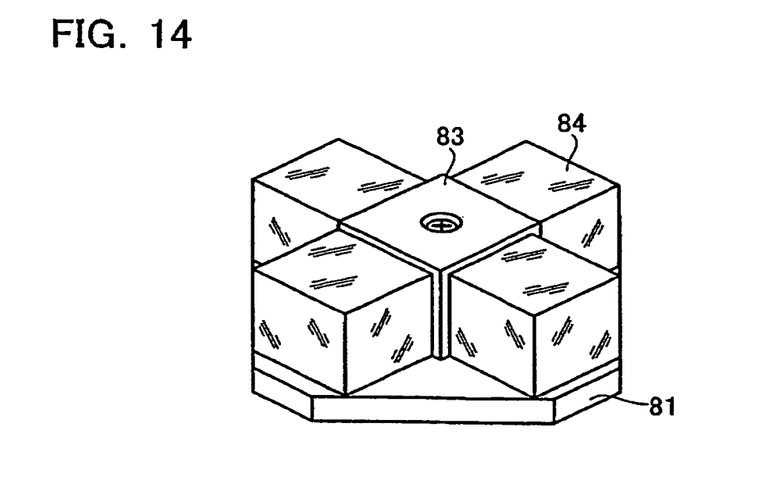
FIG. 14 is a view showing an example of a conventional calibrating jig.

For example, in patent document 1, there is proposed a calibrating jig in which a metal film of a trapezoidal pattern having two nonparallel linear knife edges is formed on a planar substrate. In addition, there is also known a calibrating jig in which a hollow cylindrically-shaped block 82 having a planer upper surface is formed on a substrate 81, as shown in FIG. 13. There is also calibrating jig in which a rectangular metal block 83 having knife edges at four sides is formed on a substrate 81 and a periphery of the block 83 is surrounded by acrylic blocks 84. This enables image measurement and optical probe measurement of the four sides of the metal block, as shown in FIG. 14. However, there is a problem that, since an error in calculating the offset value in these calibrating jigs depends on a flatness and perpendicularity of the blocks, an adjusting process in an assembled state of components becomes necessary so that the jigs are expensive. Furthermore, in a case of the calibrating jig in patent document 1 and FIG. 14, there is a problem that each of the sides of the block must be aligned with measuring coordinates of a measuring instrument, leading to poor operability.

On the other hand, in three-dimensional measuring instruments using a touch probe, a reference sphere of known radius that is precisely measured beforehand is used for offset calculation for calibration of a device. The reference sphere has an advantage that, since it has no directionality, there is no need for any alignment with the measuring coordinates, or the like. However, in a case of an image measuring instrument, it is difficult to use the reference sphere for offset adjustment. This is because, in a case of image measurement, an edge portion of the reference sphere cannot be clearly determined, whichever kind of illumination, for example, incident-light illumination, transmitted illumination, oblique illumination, and so on, is used. As a consequence, a central position of the reference sphere cannot be accurately calculated.

Accordingly, in response to the above-described problem, patent document 2 (JP 2007-78635 A) discloses a calibrating jig having a sphere and a diffusion surface (a surface that diffuses light). This calibrating jig is for obtaining the offset using an edge between the sphere and the diffusion surface. However, in a case of using the calibrating jig in patent document 2, it is necessary to accurately set a value of a diameter of the sphere, and a distance from a center of the sphere to the diffusion surface of the sphere.

In view of this problem, the present invention has an object of providing a calibrating jig, a profile measuring device, and a method of offset calculation in the profile measuring device in which a cost can be kept low and the offset can be calculated with high precision.

SUMMARY OF THE INVENTION

To achieve the above-described object, a calibrating jig in accordance with a first aspect of the present invention comprises: a reference sphere; and a reflecting plate configured to support the reference sphere from a lower side thereof and mirror-reflect light in a case that the reference sphere is illuminated from an upper side thereof.

By the above-described configuration, light irradiated from above the reference sphere is mirror-reflected (returns in a same direction as a direction of incidence) by a top and vicinity thereof of the reference sphere and by the reflecting plate. On the other hand, at places other than the top and vicinity thereof of the reference sphere, light irradiated from above the reference sphere is not mirror-reflected and does not enter an imaging optical system. As a result, an edge of the reference sphere can be clearly determined.

A surface of the reference sphere is preferably configured as a mirror surface. The calibrating jig may also be configured to further comprise a reference block formed on the reflecting plate and having a planar upper surface.

A calibrating jig in accordance with a second aspect of the present invention comprises a reference sphere; and a transmission plate for supporting the reference sphere from a lower side thereof and transmits light.

By the above-described configuration, light irradiated from below the reference sphere is transmitted at a region other than a region in which the reference sphere is provided. As a result, an edge of the reference sphere can be clearly determined.

A profile measuring device in accordance with a third aspect of the present invention comprises: a first probe configured to acquire information related to a profile of an object-to-be-measured by imaging an image based on reflected light from the object-to-be-measured; a second probe configured to acquire information related to the profile of the object-to-be-measured, the second probe being provided at a different position to the first probe; a calibrating jig to be measured by the first probe and the second probe; a measuring section for measuring the calibrating jig by the first probe and the second probe, respectively, to obtain a first measurement result and a second measurement result respectively; and an offset calculating section for comparing the first measurement result and the second measurement result to calculate an offset between the first measurement result and the second measurement result, the calibrating jig including: a reference sphere; and a reflecting plate configured to support the reference sphere from a lower side thereof and mirror-reflect light in a case that the reference sphere is illuminated from an upper side thereof.

A profile measuring device in accordance with a fourth aspect of the present invention comprises: a third probe configured to acquire information related to a profile of an object-to-be-measured by imaging an image based on transmitted light from the object-to-be-measured; a second probe configured to acquire information related to the profile of the object-to-be-measured, the second probe being provided at a different position to the third probe; a calibrating jig to be measured by the third probe and the second probe; a measuring section for measuring the calibrating jig by the third probe and the second probe, respectively, to generate a third measurement result and a second measurement result respectively; and an offset calculating section for comparing the third measurement result and the second measurement result to calculate an offset between the third measurement result and the second measurement result, the calibrating jig including: a reference sphere; and a transmission plate for supporting the reference sphere from a lower side thereof and transmits light.

A method of offset calculation in accordance with a fifth aspect of the present invention is a method of offset calculation in which a profile measuring device is used to calculate an offset in the profile measuring device, the profile measuring device comprising: a first probe configured to acquire information related to a profile of an object-to-be-measured by imaging an image based on reflected light from the object-to-be-measured; a second probe configured to acquire information related to the profile of the object-to-be-measured, the second probe being provided at a different position to the first probe; and a calibrating jig to be measured by the first probe and the second probe, the calibrating jig including: a reference sphere; and a reflecting plate configured to support the reference sphere from a lower side thereof and mirror-reflect light in a case that the reference sphere is illuminated from an upper side thereof, the method comprising the steps of: measuring the calibrating jig by the first probe and the second probe, respectively, to obtain a first measurement result and a second measurement result respectively; and comparing the first measurement result and the second measurement result to calculate an offset between the first measurement result and the second measurement result.

A method of offset calculation in accordance with a sixth aspect of the present invention is a method of offset calculation in which a profile measuring device is used to calculate an offset in the profile measuring device, the profile measuring device comprising: a third probe configured to acquire information related to a profile of an object-to-be-measured by imaging an image based on transmitted light from the object-to-be-measured; a second probe configured to acquire information related to the profile of the object-to-be-measured, the second probe being provided at a different position to the third probe; and a calibrating jig to be measured by the third probe and the second probe, the calibrating jig including: a reference sphere; and a transmission plate for supporting the reference sphere from a lower side thereof and transmits light, the method comprising the steps of: measuring the calibrating jig by the third probe and the second probe, respectively, to generate a third measurement result and a second measurement result respectively; and comparing the third measurement result and the second measurement result to calculate an offset between the third measurement result and the second measurement result.

The present invention enables provision of a calibrating jig, a profile measuring device, and a method of offset calculation in the profile measuring device in which a cost can be kept low and the offset can be calculated with high precision.

DETAILED DESCRIPTION OF THE EMBODIMENTS

An embodiment of the present invention is now described in detail with reference to the drawings.

First Embodiment

Configuration of a Calibrating Jig in Accordance with a First Embodiment

Figure 1:
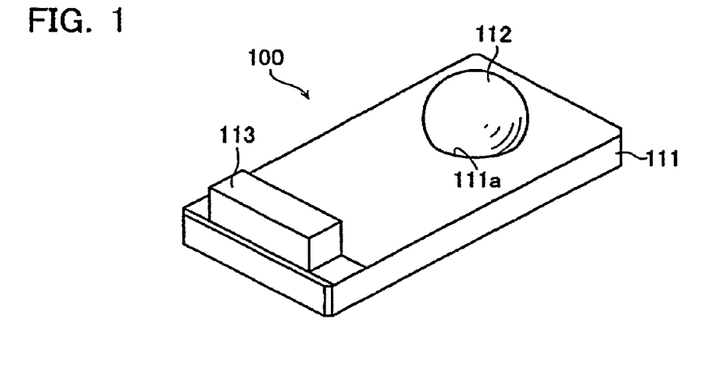
FIG. 1 is a perspective view of a calibrating jig 100 in accordance with a first embodiment of the present invention.

First, a configuration of a calibrating jig 100 in accordance with a first embodiment is described with reference to FIG. 1. FIG. 1 is a perspective view of the calibrating jig 100 in accordance with the first embodiment of the present invention. The calibrating jig 100 is measured by an imaging probe 34 and a laser probe 35 to be described hereafter. The calibrating jig 100 includes a reflecting plate 111, a reference sphere 112, and a reference block 113.

The reflecting plate 111 supports the reference sphere 112 from a lower side thereof. The reflecting plate 111 is configured to mirror-reflect light where the reference sphere 112 is illuminated from an upper side thereof by incident-light illumination or the like. The reflecting plate 111 is configured by a mirror of vapor-deposited chromium or the like. The reflecting plate 111 has a form of a rectangular plate. The reflecting plate 111 has a planar surface of good parallelism. The reflecting plate 111 has in a vicinity of a center thereof a concave recess 111a.

The reference sphere 112 is provided so that a lower portion thereof fits to the recess 111a of the reflecting plate 111. The reference sphere 112 is a steel sphere (high precision bearing ball) that has a known dimension (diameter D) precisely measured beforehand. The reference sphere 112 has a surface of high reflectance. That is to say, the surface of the reference sphere 112 is configured as a mirror surface.

The reference block 113 is provided on an upper portion of one end of the reflecting plate 111. The reference block 113 is a steel rectangular block formed so that a surface is planar.

Configuration of a Profile Measuring Device in Accordance with the First Embodiment A configuration of a profile measuring device 200 in accordance with the first embodiment is now described with reference to FIGS. 2~4.

Figure 2:
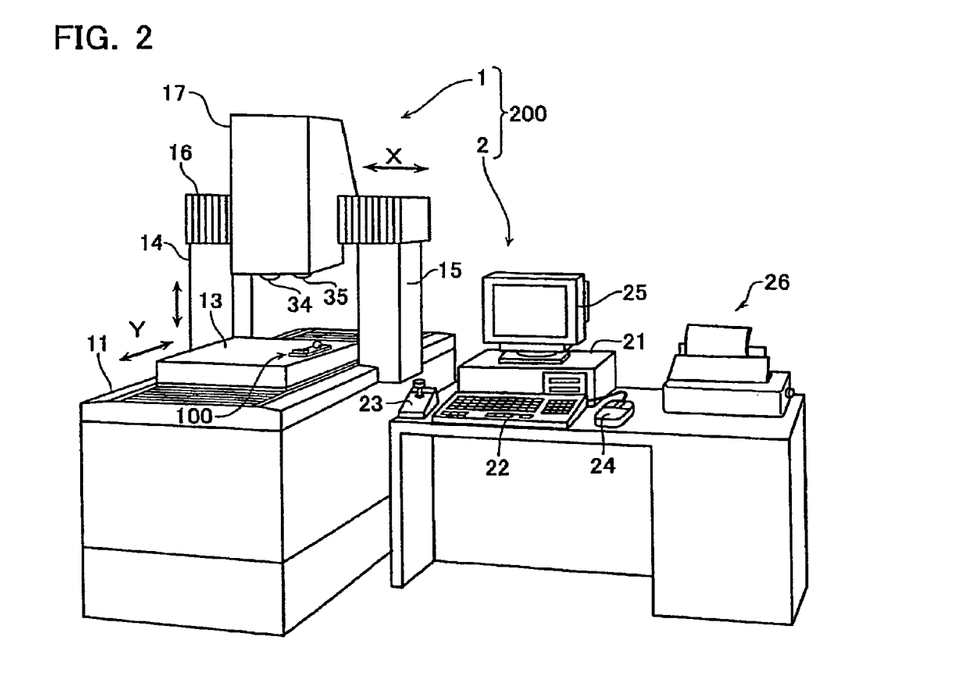
FIG. 2 is a schematic perspective view of a profile measuring device 200 in accordance with the first embodiment.

FIG. 2 is a schematic perspective view of the profile measuring device 200 in accordance with the first embodiment. As shown in FIG. 2, the profile measuring device 200 is configured by a profile measuring instrument 1 and a computer system 2 that drives and controls the profile measuring instrument 1 and executes required data processing.

The profile measuring instrument 1 is configured as follows. Namely, attached to a mount 11 is a measuring table 13 that has an object-to-be-measured positioned thereon. The measuring table 13 is driven in a Y axis direction by a Y axis drive mechanism not shown. Fixed at a central portion of an edge of both sides of the mount 11 are supporting arms 14 and 15 that extend upwardly, and there is an X axis guide 16 fixed so as to connect an upper extremity of both the supporting arms 14 and 15. The X axis guide has a measuring unit 17 supported thereon. The measuring unit 17 is driven along the X axis guide 16 by an X axis drive mechanism not shown. Note that the above-mentioned calibrating jig 100 is disposed on the measuring table 13.

Figure 3:
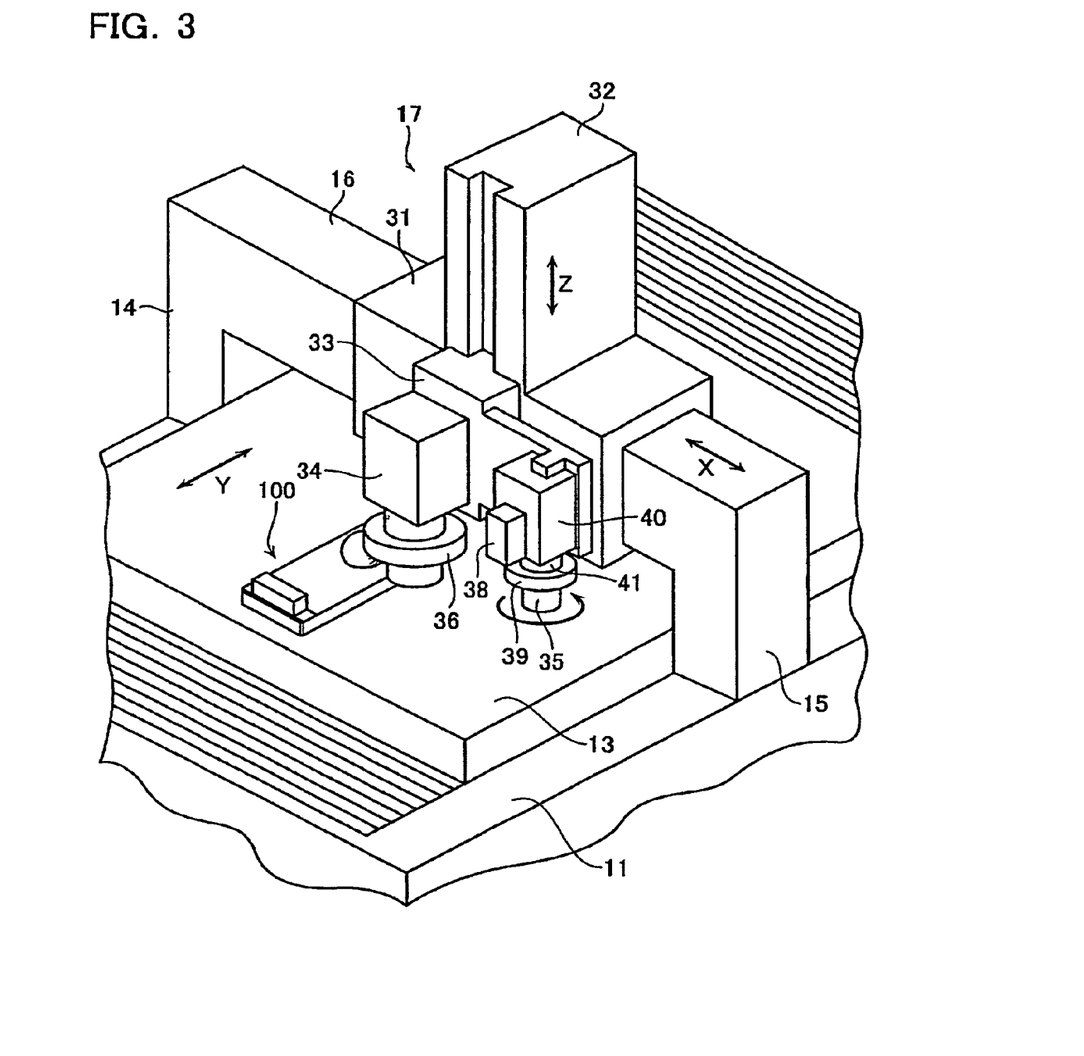
FIG. 3 is an enlarged perspective view of a measuring unit 17 in accordance with the first embodiment.

FIG. 3 is an enlarged perspective view of the measuring unit 17 in accordance with the first embodiment. As shown in FIG. 3, the measuring unit 17 has a slider 31 movably provided along the X axis guide 16, and has a Z axis guide 32 fixed integrally to the slider 31. The Z axis guide 32 has a supporting plate 33 slidably provided in a Z axis direction, and the supporting plate 33 is provided both with an imaging probe (first probe, CCD camera) 34 that is an imaging means for image measurement, and a laser probe (second probe) 35 that is a noncontact displacement gauge. The imaging probe 34 and the laser probe 35 are thus configured to maintain a constant positional relationship and to be simultaneously movable in three axis directions of X, Y, and Z. Appended to the imaging probe 34 is an illuminating device 36 for illuminating an imaging range. Provided at a position of proximity to the laser probe 35 in order to confirm by a laser beam of the laser probe 35 a measuring position of a work are a CCD camera 38 that takes an image of a periphery of the measuring position, and an illuminating device 39 for illuminating a measuring position of the laser probe 35. The laser probe 35 is supported by a vertical movement mechanism 40 for withdrawing the laser probe 35 when there is a movement of the measuring unit 17, and a rotation mechanism 41 for adjusting a directionality of the laser beam to an optimal direction.

To put the above-described configuration another way, the imaging probe (first probe) 34 acquires information related to a profile of the object-to-be-measured by taking an image based on reflected light from the object-to-be-measured (an image due to incident-light illumination light); and the laser probe (second probe) 35 acquires information related to the profile of the object-to-be-measured, while being provided at a different position to the imaging probe 34.

The computer system 2 is configured to include a computer main unit 21, a keyboard 22, a joy stick box (hereafter referred to as "J/S") 23, a mouse 24, a CRT 25, and a printer 26.

Figure 4:
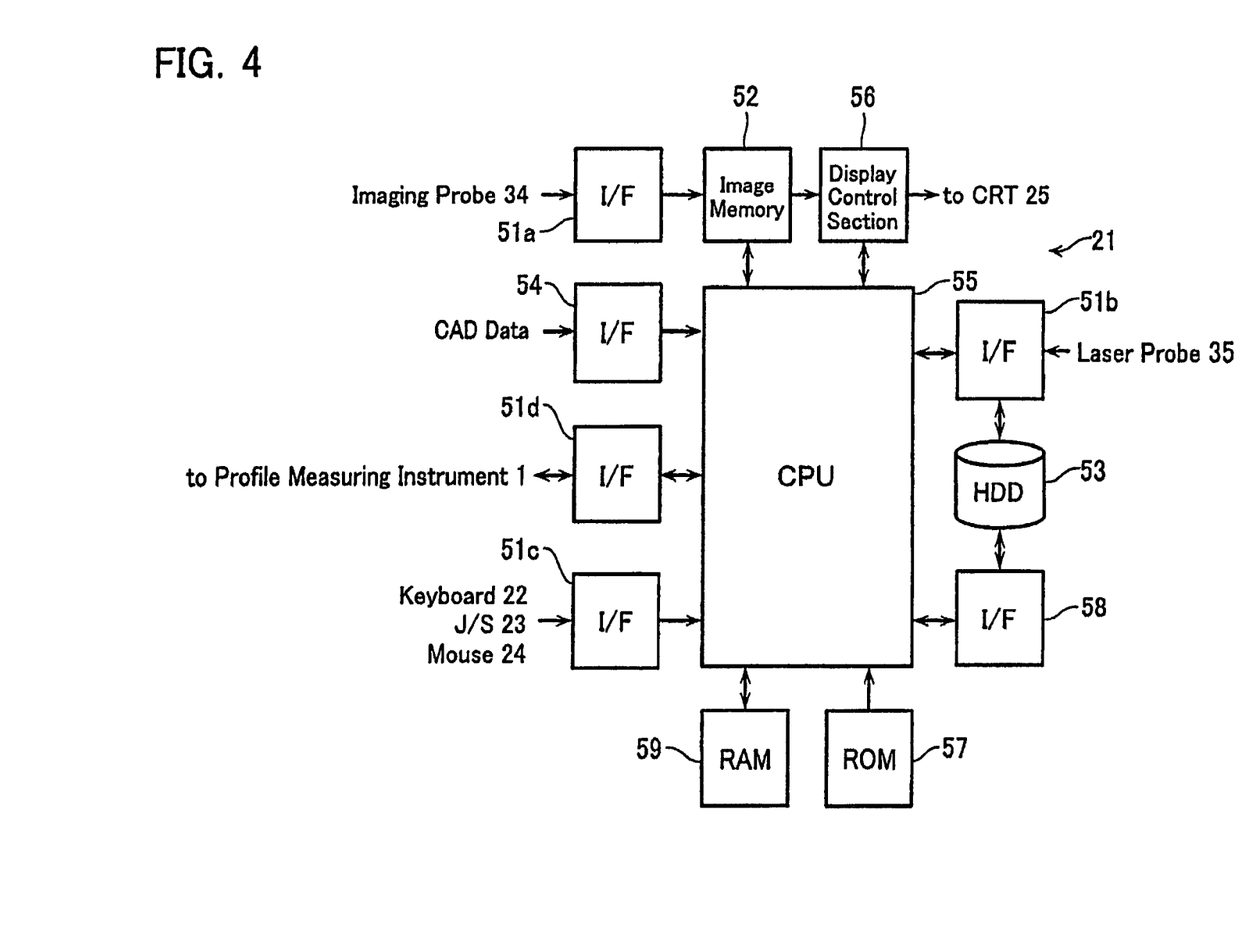
FIG. 4 is a block diagram showing a computer main unit 21 in accordance with the first embodiment.

The computer main unit 21 is configured as shown in FIG. 4. FIG. 4 is a block diagram showing the computer main unit 21 in accordance with the first embodiment.

As shown in FIG. 4, image information inputted from the imaging probe 34 is stored in an image memory 52 via an interface (hereafter referred to as "I/F") 51a. Information inputted from the laser probe 35 is stored in an HDD 53 via an interface 51b.

In addition, CAD data of an object-to-be-measured created by a CAD system not shown, for example, in a case that off-line teaching is implemented by CAD data, is inputted to a CPU (control section) 55 via an I/F 54, has an image format thereof converted by the CPU 55, and is then stored in the image memory 52. The image information stored in the image memory 52 is displayed on the CRT 25 via a display control section 56.

Meanwhile, code information and position information and the like inputted from the keyboard 22, the J/S 23, and the mouse 24 are inputted to the CPU 55 via an I/F 51c. The CPU 55 executes measurement execution processing, offset calculation processing, and the like, in accordance with a macro-program stored in a ROM 57, and a measurement execution program, an offset calculation program, and the like, stored in a RAM 59 from the HDD 53 via an I/F 58.

The CPU 55 functions as a measuring section, reading the measurement execution program from the HDD 53. In addition, the CPU 55 functions as an offset calculating section, reading the offset calculation program from the HDD 53. Here, the measuring section measures the calibrating jig 100 by the imaging probe 34, respectively, and the laser probe 35 to obtain an imaging measurement result (first measurement result) and a laser probe measurement result (second measurement result) respectively; and the offset calculating section compares the imaging measurement result and the laser probe measurement result to calculate the offset between the imaging probe 34 and the laser probe 35.

The HDD 53 is a recording medium that stores CAD data, the measurement execution program, the offset calculation program, and so on. The RAM 59, in addition to storing various kinds of programs, offers a work region for various kinds of processing.

Figure 5:
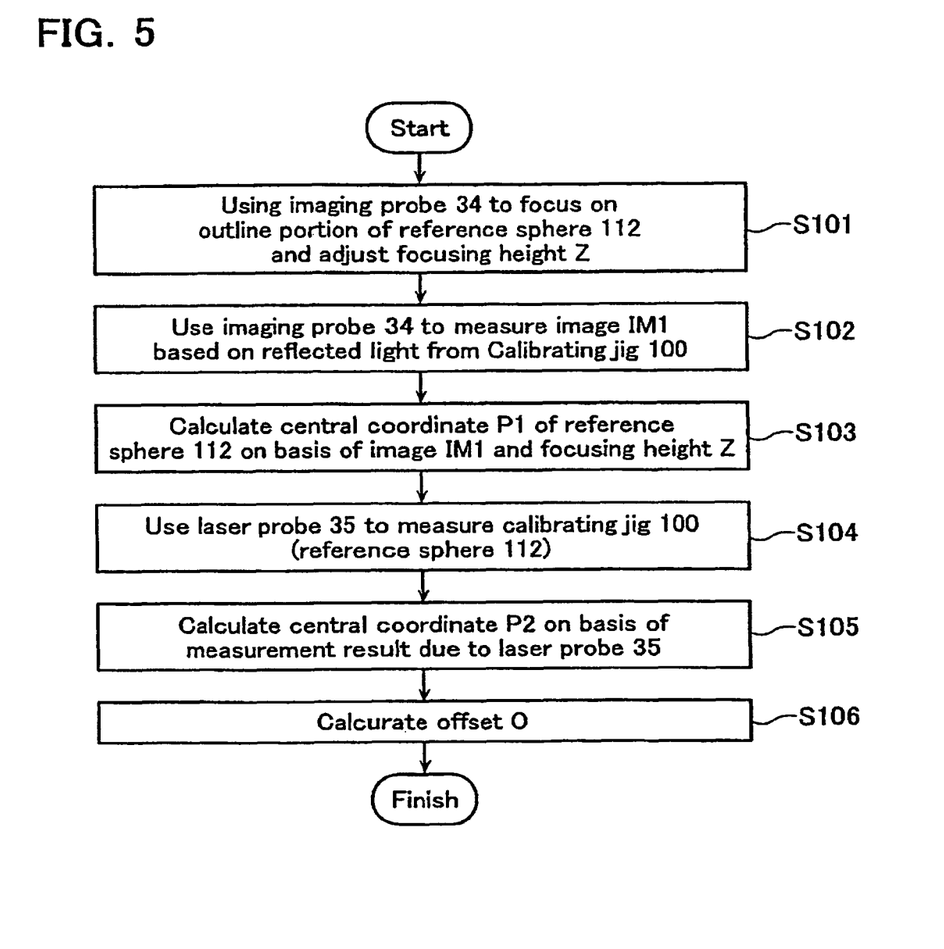
FIG. 5 is a flowchart showing a first offset calculating operation of the profile measuring device 200 in accordance with the first embodiment.
Figure 6:
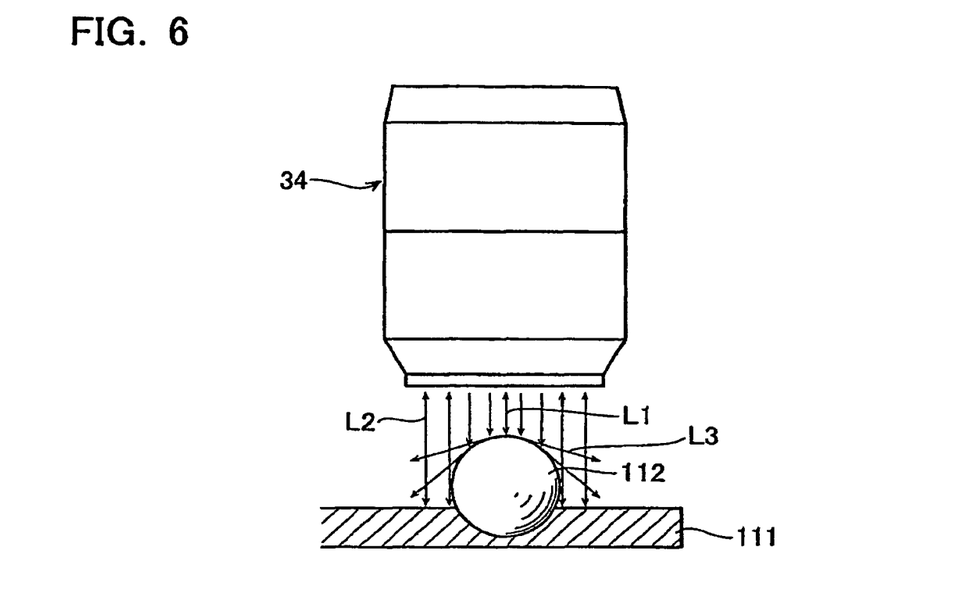
FIG. 6 is a view schematically describing a measurement of an image IM1.
Figure 7:
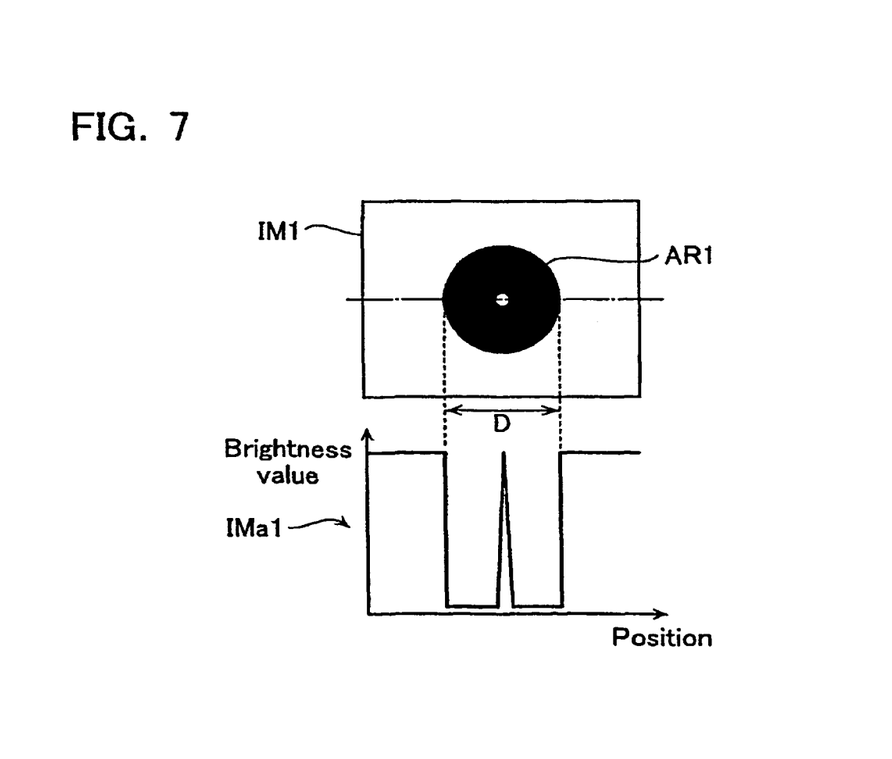
FIG. 7 is a view showing the image IM1 and brightness information IMa1 due to an imaging probe 34.
Figure 8:
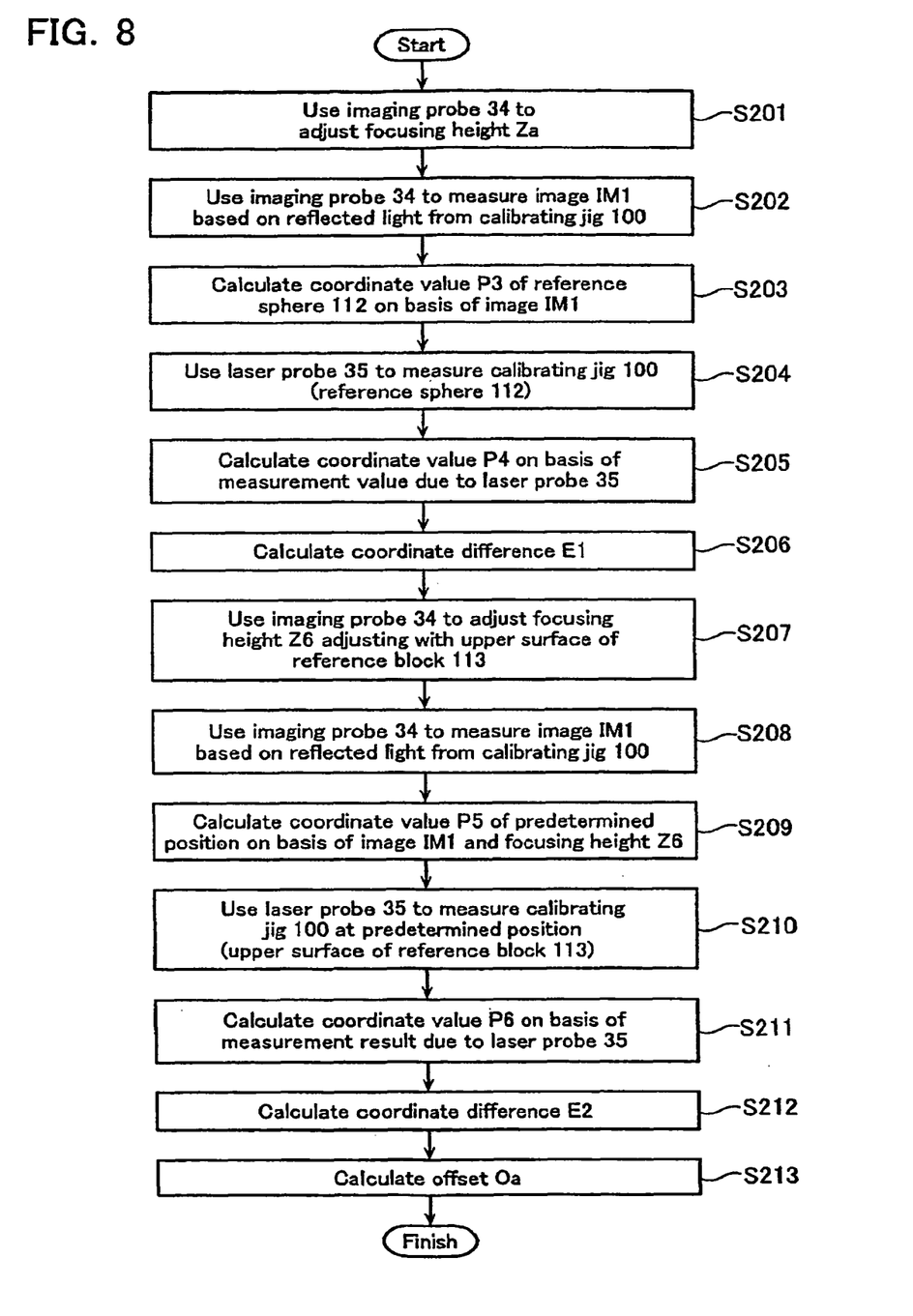
FIG. 8 is a flowchart showing a second offset calculating operation of the profile measuring device 200 in accordance with the first embodiment.

Offset Calculating Operation of the Profile Measuring Device 200 in Accordance with the First Embodiment An offset calculating operation of the profile measuring device 200 in accordance with the first embodiment is now described with reference to FIGS. 5-8. The profile measuring device 200 in accordance with the first embodiment is configured to enable execution of a first and second offset calculating operation. FIG. 5 is a flowchart showing the first offset calculating operation of the profile measuring device 200 in accordance with the first embodiment. FIG. 6 is a view schematically explaining a measurement of an image IM1 to be described hereafter. FIG. 7 is a view showing the image IM1 and brightness information IMa1 due to the imaging probe 34. FIG. 8 is a flowchart showing the second offset calculating operation of the profile measuring device 200 in accordance with the first embodiment. Note that the operations shown hereafter are realized by the control section (CPU) 55 reading and executing programs stored in the HDD 53.

First, a description is given of the first offset calculating operation. Suitable for the first offset calculating operation is an imaging probe having an optical system with a high magnification and a shallow depth of focus.

First, the control section 55 uses the imaging probe 34 to implement a focusing operation on (focus on) an outline portion of the reference sphere 112 to adjust a focusing height Z (step S101), as shown in FIG. 5. Here, the focusing height Z indicates a distance between the measuring table 13 and the imaging probe 34.

Next, the control section 55 uses the imaging probe 34 to measure the image IM1 based on reflected light from the calibrating jig 100 (step S102).

Here, the operation of the above-described step S102 is schematically illustrated in FIG. 6. That is to say, light L1 irradiated to a top and vicinity thereof of the reference sphere 112 is mirror-reflected upwardly, as shown in FIG. 6. In addition, light L2 irradiated to an upper surface of the reflecting plate 111 is mirror-reflected upwardly. On the other hand, light L3 irradiated to regions other than the top and vicinity thereof of the reference sphere 112 is not mirror-reflected upwardly and does not enter the imaging probe 34. The imaging probe 34 thus measures the image IM1 based on the reflected light of the light L1 and L2.

The image IM1 displays a doughnut-shaped dark portion AR1 having an outside diameter D, as shown in FIG. 7. The brightness information IMa1 of the image IM1 for a boundary portion (edge) between the reference sphere 112 and the reflecting plate 111 is shown with high contrast.

Subsequently, the control section 55 calculates a central coordinate P1 ($X_{P1}, Y_{P1}, Z_{P1}$) of the reference sphere 112 on the basis of the image IM1 and the focusing height Z (step S103), as shown again in FIG. 5. Here, the control section 55 obtains the central coordinate P1 by pinpointing the outline portion (edge) of the dark portion AR1 at three or more places for the image IM1.

Next, the control section 55 uses the laser probe to measure a surface of the calibrating jig 100 (reference sphere 112) at four or more places (step S104). Subsequently, the control section 55 calculates a central coordinate P2 ($X_{P2}, Y_{P2}, Z_{P2}$) of the reference sphere 112 on the basis of a measurement result due to the laser probe 35 (step S105).

Then, the control section 55 calculates an offset O between the imaging probe 34 and the laser probe 35, according to (expression 1) shown below (step S106). This concludes the first offset calculating operation.

$$O=(X_0,Y_0,Z_0)=P2-P1=(X_{P2}-X_{P1}, Y_{P2}-Y_{P1}, Z_{P2}-Z_{P1}) \quad \text{(expression 1)}$$

Note that the above-described first offset calculating operation can be rephrased in the following way. That is to say, in steps S101~S105, the control section 55 measures the calibrating jig 100 by the imaging probe 34 and the laser probe 35 to obtain the central coordinate (first measurement result) P1 and the central coordinate (second measurement result) P2. Furthermore, in step S106, the control section 55 calculates the offset O by comparing the central coordinate P1 and the central coordinate P2.

Next, a description is given of the second offset calculating operation. Suitable for the second offset calculating operation is an imaging probe having an optical system with a low magnification and a deep depth of focus.

First, the control section 55 uses the imaging probe 34 to implement a focusing operation (focus) to adjust a focusing height Za (step S201), as shown in FIG. 8. Here, the focusing operation of step S201 is implemented so as to align the focusing height Za with a height at which the outline portion of the reference sphere 112 can be most clearly observed. Note that, since there is a high possibility that the focusing height Za does not accurately capture a central position of the reference sphere 112, the focusing height Za is not used in processing to be described hereafter.

Next, the control section 55 uses the imaging probe 34 to measure the image IM1 based on reflected light from the calibrating jig 100 (step S202).

Subsequently, the control section 55 calculates a coordinate value P3 (P3=$X_{P3}, Y_{P3}$) of the reference sphere 112 on the basis of the image IM1 (step S203). Note that the coordinate value P3 represents a coordinate excluding a Z axis direction (XY coordinate).

Next, the control section 55 uses the laser probe 35 to measure the surface of the calibrating jig 100 (reference sphere 112) at four or more places (step S204). Subsequently, the control section 55 calculates a coordinate value P4 (P4=$X_{P4}, Y_{P4}$) of the reference sphere 112 on the basis of a measurement result due to the laser probe 35 (step S205). Note that the coordinate value P4 represents a coordinate excluding a Z axis direction (XY coordinate).

Next, the control section 55 calculates a coordinate difference E1 ($X_E, Y_E$), according to (expression 2) shown below (step S206). Note that the coordinate difference E1 signifies an offset in an XY direction between the imaging probe 34 and the laser probe 35.

$$E1=(X_E,Y_E)=P4-P3=(X_{P4}-X_{P3}, Y_{P4}-Y_{P3}) \quad \text{(expression 2)}$$

Subsequently, the control section 55 uses the imaging probe 34 to implement a focusing operation that aligns with an upper surface of the reference block 113 to adjust a focusing height Zb (step S207).

Next, the control section 55 uses the imaging probe 34 to measure the image IM1 based on reflected light from the calibrating jig 100 (step S208). Then, the control section 55 calculates a coordinate value P5 ($X_{P5}, Y_{P5}, Z_{P5}$) of a predetermined position of the upper surface of the reference block 113 on the basis of the image IM1 and the focusing height Zb (step S209).

Next, the control section 55 uses the laser probe 35 to measure the upper surface of the reference block 113 at the predetermined position (step S210). To implement the above-described measurement with the laser probe 35 in step S210, the control section 55 moves the laser probe only by the coordinate difference E1 ($X_E, Y_E$).

Subsequently, the control section 55 calculates a coordinate value P6 ($X_{P6}, Y_{P6}, Z_{P6}$) of the predetermined position of the upper surface of the reference block 113 on the basis of a measurement result due to the laser probe 35 (step S211).

Next, the control section 55 calculates a coordinate difference E2 ($Z_E$), according to (expression 3) shown below (step S212). Note that the coordinate difference E2 signifies the offset in a Z direction between the imaging probe 34 and the laser probe 35.

$$E2=(Z_E)=(Z_{P6}-Z_{P5}) \quad \text{(expression 3)}$$

Then, the control section 55 calculates an offset Oa ($X_{Oa}, Y_{Oa}, Z_{Oa}$) between the imaging probe 34 and the laser probe 35 on the basis of the coordinate differences E1 and E2, according to (expression 4) shown below (step S213). This concludes the second offset calculating operation.

$$Oa=(X_{Oa},Y_{Oa},Z_{Oa})=(X_{P4}-X_{P3}, Y_{P4}-Y_{P3}, Z_{P6}-Z_{P6}) \quad \text{(expression 4)}$$

Note that the above-described second offset calculating operation can be rephrased in the following way. That is to say, in steps S201~S212, the control section 55 measures the calibrating jig 100 by the imaging probe 34 and the laser probe 35 to obtain the coordinate values (first measurement result) P3 and P5 and the coordinate values (second measurement result) P4 and P6. Furthermore, in step S213, the control section 55 calculates the offset Oa by comparing the coordinate values P3 and P5 and the coordinate values P4 and P6.

Effect in Accordance with the First Embodiment

An effect of the calibrating jig 100, the profile measuring device 200, and the method of offset calculation therein in accordance with the first embodiment is now described. The calibrating jig 100 in accordance with the first embodiment does not require an adjustment process in an assembled state of components, as does a conventional calibrating jig, and a cost can therefore be kept low.

The calibrating jig 100 in accordance with the first embodiment can take an image of the edge of the reference sphere 112 with high contrast. As a result, calibration (offset calculation) of the profile measuring device 200 can be effected with high precision.

The calibrating jig 100 in accordance with the first embodiment mirror-reflects light at the reflecting plate 111 and can therefore suppress a loss of reflected light with respect to a quantity of light irradiated. Consequently, the calibrating jig 100 in accordance with the first embodiment can measure an image with a sufficient contrast even under a small quantity of light. That is to say, the calibrating jig 100 in accordance with the first embodiment can suppress a linear expansion caused by a temperature rise of the jig itself due to intense illuminating light, thereby reducing a measurement error. Moreover, since the calibrating jig 100 in accordance with the first embodiment does not require a bright light source, energy savings can be attempted.

In addition, the profile measuring device 200 and the method of offset calculation therein in accordance with the first embodiment display a similar effect to that of the calibrating jig 100 having the above-described configuration.

Second Embodiment

Configuration of a Calibrating Jig in Accordance with a Second Embodiment

Figure 9:
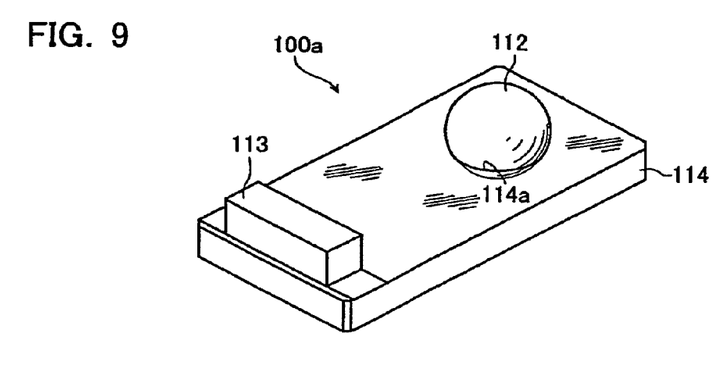
FIG. 9 is a perspective view of a calibrating jig 100a in accordance with a second embodiment of the present invention.

A configuration of a calibrating jig 100a in accordance with a second embodiment is now described with reference to FIG. 9. FIG. 9 is a perspective view of the calibrating jig 100a in accordance with the second embodiment of the present invention. Note that, in the second embodiment, identical symbols are assigned to configurations that are similar to those of the first embodiment, and a description thereof is omitted.

The calibrating jig 100a is measured by the imaging probe 34 and the laser probe 35. The calibrating jig 100a comprises a transmission plate 114, the reference sphere 112, and the reference block 113. In other words, the calibrating jig 100a includes the transmission plate 114 in place of the reflecting plate 111 of the first embodiment.

The transmission plate 114 supports the reference sphere 112 from a lower side thereof. The transmission plate 114 is configured by glass, for example. The transmission plate 114 has a rectangular plate shape. The transmission plate 114 has on an upper surface thereof a concave recess 114a.

Here, in a case that transmitted illuminating light is used in the profile measuring device, a distribution of light blocked by the reference sphere 112 is measured as an image. Even if the reference sphere 112 is disposed at an incline to an optical axis at this time, such a disposition exerts no influence on the image measured (a fixed circular dark portion is always measured). Accordingly, parallelism is not required in the transmitting plate 114.

The reference sphere 112 is provided so that a lower portion thereof fits to the recess 114a of the transmission plate 114.

The reference block 113 is provided on an upper portion of one end of the reflecting plate 114.

Figure 10:
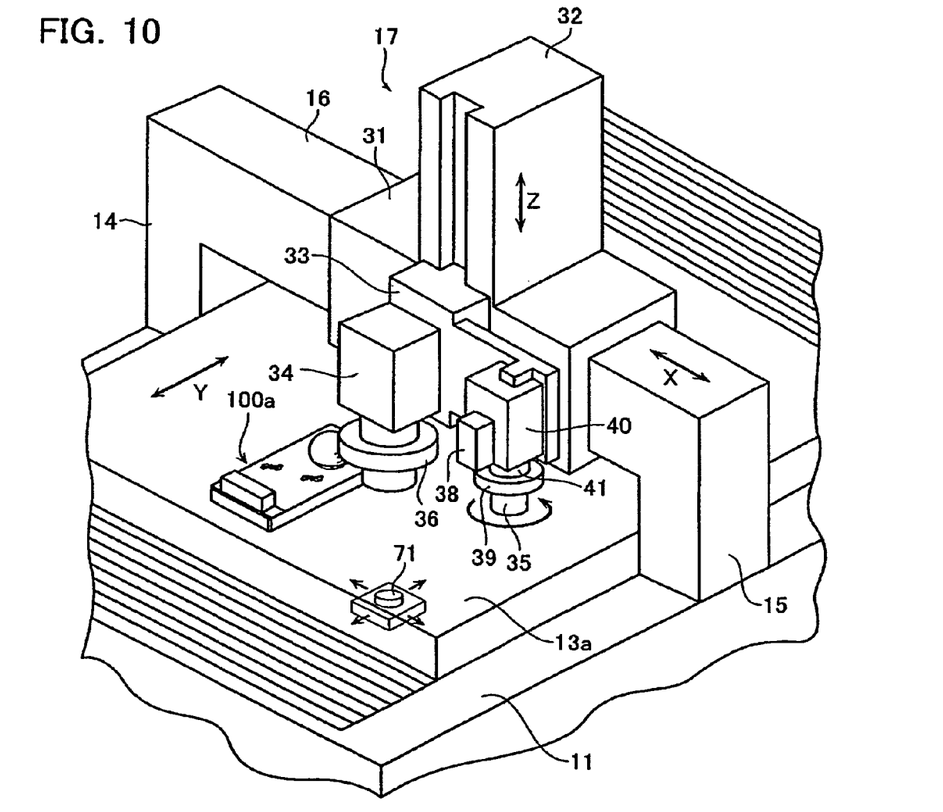
FIG. 10 is an enlarged perspective view of a measuring unit 17 in accordance with the second embodiment.

Configuration of a Profile Measuring Device in Accordance with the Second Embodiment A configuration of a profile measuring device in accordance with the second embodiment is now described with reference to FIG. 10. FIG. 10 is an enlarged perspective view of a measuring unit 17 in accordance with the second embodiment.

A profile measuring instrument in accordance with the second embodiment has a measuring table 13a that differs from that of the first embodiment. In addition, the profile measuring instrument in accordance with the second embodiment further includes an illuminating device 71.

The measuring table 13a is configured to transmit light. Note that the above-mentioned calibrating jig 100a is provided on the measuring table 13a.

The illuminating device 71 is provided within the measuring table 13a. The illuminating device 71 is configured to irradiate light upwardly via the measuring table 13a. The illuminating device 71 is configured to be movable in XY directions in synchronization with a movement of the imaging probe 34.

That is to say, in the second embodiment, the imaging probe (third probe) is configured to acquire information related to a profile of an object-to-be-measured by taking an image based on transmitted light (an image due to transmitted illuminating light) from the object-to-be-measured.

Figure 11:
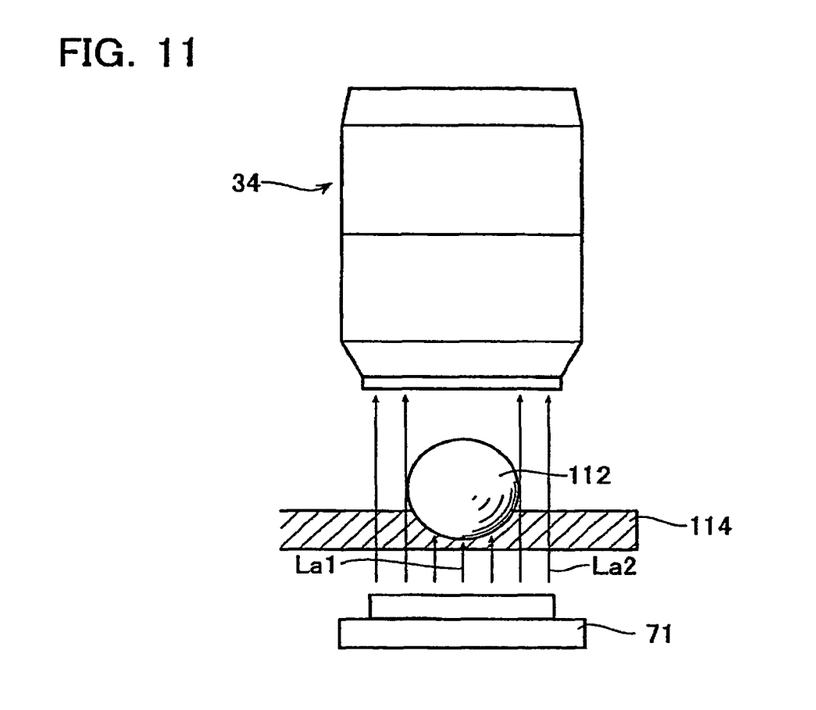
FIG. 11 is a view schematically describing a measurement of an image IM4.
Figure 12:
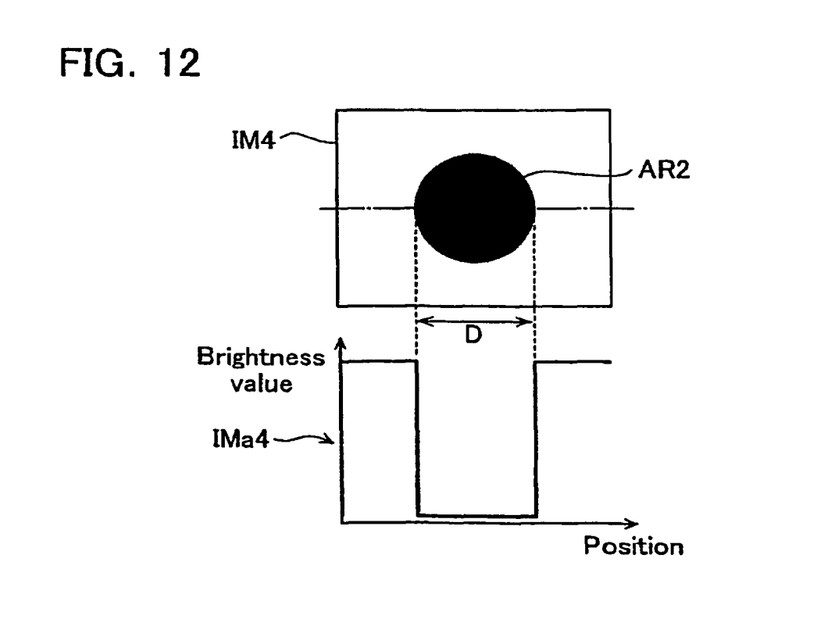
FIG. 12 is a view showing the image IM4 and brightness information IMa4 due to the imaging probe 34.

Offset Calculating Operation of the Profile Measuring Device in Accordance with the Second Embodiment An offset calculating operation of the profile measuring device in accordance with the second embodiment is now described with reference to FIGS. 11 and 12. The profile measuring device in accordance with the second embodiment is configured to enable execution of a first and second offset calculating operation, similarly to the first embodiment. FIG. 11 is a view schematically explaining a measurement of an image IM4 to be described hereafter. FIG. 12 is a view showing the image IM4 and brightness information IMa4 due to the imaging probe 34.

In the offset calculating operation of the profile measuring device in accordance with the second embodiment, a method of measuring an image by the imaging probe 34 differs from that of the first embodiment.

The control section 55 uses the imaging probe 34 to measure the image IM4 based on transmitted light from the calibrating jig 100a. That is to say, light La1 irradiated to the reference sphere 112 from the illuminating device 71 is blocked by the reference sphere 112, as shown in FIG. 11. On the other hand, light La2 irradiated to regions other than the reference sphere 112 (transmission plate 114) is transmitted via the transmission plate 114. Accordingly, the imaging probe 34 measures the image IM4 based on the light La2 (transmitted light).

The image IM4 displays a circular-shaped dark portion AR2 having a diameter D, as shown in FIG. 12. The brightness information IMa4 of the image IM4 for a boundary portion (edge) between the reference sphere 112 and the transmission plate 114 is shown with high contrast.

Effect in Accordance with the Second Embodiment

An effect in accordance with the second embodiment is now described. The calibrating jig 100a in accordance with the second embodiment has the transmission plate 114 which requires no parallelism in place of the reflecting plate 111 in accordance with the first embodiment. Consequently, the calibrating jig 100a in accordance with the second embodiment can be manufactured at a lower cost than that of the first embodiment.

In addition, the profile measuring device and the method of offset calculation therein in accordance with the second embodiment display a similar effect to that of the above-described calibrating jig 100.

This concludes description of embodiments of the present invention, but it should be noted that the present invention is not limited to the above-described embodiments, and that various substitutions, additions, deletions, and so on, are possible within a range not departing from the scope and spirit of the invention. For example, in the above-described embodiments, the reference block 113 is provided for calculating the offset value in the Z direction; however, in a case that an autofocus of the imaging probe 34 on the top of the reference sphere 112 can be implemented with good precision, the reference block 113 may be omitted. In addition, there is described a method for supporting the reference sphere 112 in which the reference sphere is fitted to the reflecting plate 112 (or the transmission plate 114), but the present invention is not limited to this. For example, the reference sphere 112 may be supported by simply adhering the reference sphere 112 to the reflecting plate 111 (or the transmission plate 114).

Moreover, in the second offset calculating operation of the above-described embodiments, the control section 55 is configured to measure the predetermined position on the surface of the reference block 113 (step S207), but it may also be configured to measure a top portion of the reference sphere 112, and, if there is a good flatness to the reflecting plate 111 or the transmission plate 114, it may be configured to measure an arbitrary position on the plates.

Furthermore, the profile measuring device in the above-described embodiments is configured to include the laser probe 35; however, it may also be configured to include a touch probe (contact type probe), a scanning probe, or the like, in place of the laser probe 35.

What is claimed is:

1. A calibrating jig, comprising:
   a reference sphere;
   a transmission plate for supporting the reference sphere, the transmission plate transmitting light; and
   a reference block formed on the transmission plate, the reference block having a planar upper surface and being constituted by steel,
   a lower portion of the reference sphere contacting an upper surface of the transmission plate, thereby the transmission plate supports the reference sphere from a lower side of the reference sphere.

2. A profile measuring device, comprising:
   a first probe configured to acquire information related to a profile of an object-to-be-measured by imaging an image based on transmitted light from the object-to-be-measured;
   a second probe configured to acquire information related to the profile of the object-to-be-measured, the second probe being provided at a different position to the first probe;
   a calibrating jig to be measured by the first probe and the second probe;
   a measuring section for measuring the calibrating jig by the first probe and the second probe, respectively, to generate a first measurement result and a second measurement result respectively; and
   an offset calculating section for comparing the first measurement result and the second measurement result to calculate an offset between the first measurement result and the second measurement result,
   the calibrating jig including:
   a reference sphere;
   a transmission plate for supporting the reference sphere, the transmission plate transmitting light; and
   a reference block formed on the transmission plate, the reference block having a planar upper surface and being constituted by steel,
   a lower portion of the reference sphere contacting an upper surface of the transmission plate, thereby the transmission plate supports the reference sphere from a lower side of the reference sphere.

3. A method of offset calculation in which a profile measuring device is used to calculate an offset in the profile measuring device, the profile measuring device comprising: a first probe configured to acquire information related to a profile of an object-to-be-measured by imaging an image based on transmitted light from the object-to-be-measured; a second probe configured to acquire information related to the profile of the object-to-be-measured, the second probe being provided at a different position to the first probe; and a calibrating jig to be measured by the first probe and the second probe, the calibrating jig including: a reference sphere; and a transmission plate for supporting the reference sphere, the transmission plate transmitting light; and a reference block formed on the transmission plate, the reference block having a planar upper surface and being constituted by steel, a lower portion of the reference sphere contacting an upper surface of the transmission plate, thereby the transmission plate supports the reference sphere from a lower side of the reference sphere, the method comprising the steps of:
   measuring the calibrating jig by the first probe and the second probe, respectively, to generate a first measurement result and a second measurement result respectively; and
   comparing the first measurement result and the second measurement result to calculate an offset between the first measurement result and the second measurement result.

* * * * *